Dec. 6, 1966  B. B. MATHIAS  3,289,834
INSPECTING CONTAINERS FOR SLANT BOTTOM CONDITION
Filed Sept. 23, 1963  4 Sheets-Sheet 1

INVENTOR.
BENNY B. MATHIAS
BY G. F. Innis &
W. A. Schaich
ATTORNEYS

Dec. 6, 1966    B. B. MATHIAS    3,289,834
INSPECTING CONTAINERS FOR SLANT BOTTOM CONDITION
Filed Sept. 23, 1963    4 Sheets-Sheet 2

INVENTOR.
BENNY B. MATHIAS
BY
ATTORNEYS

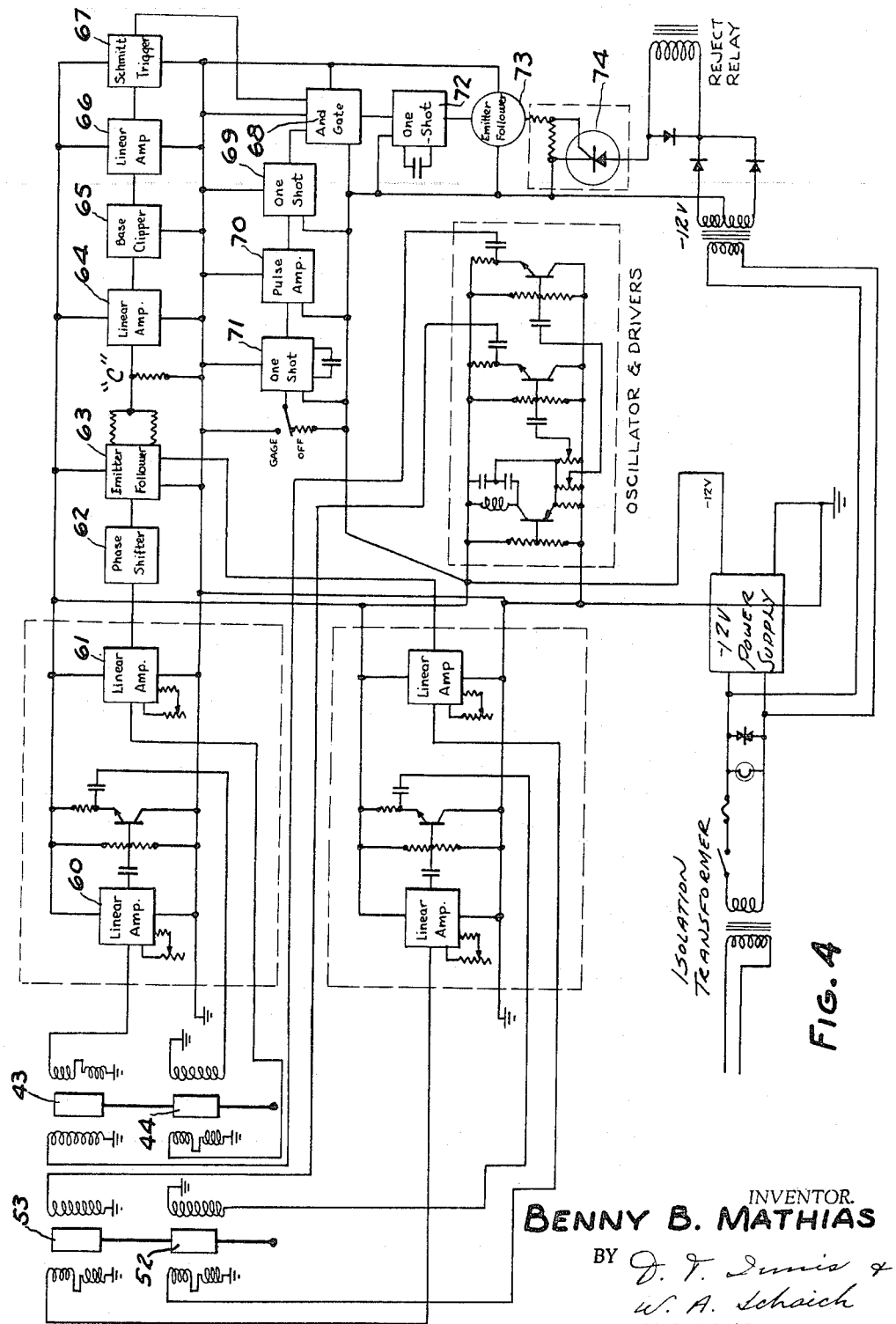

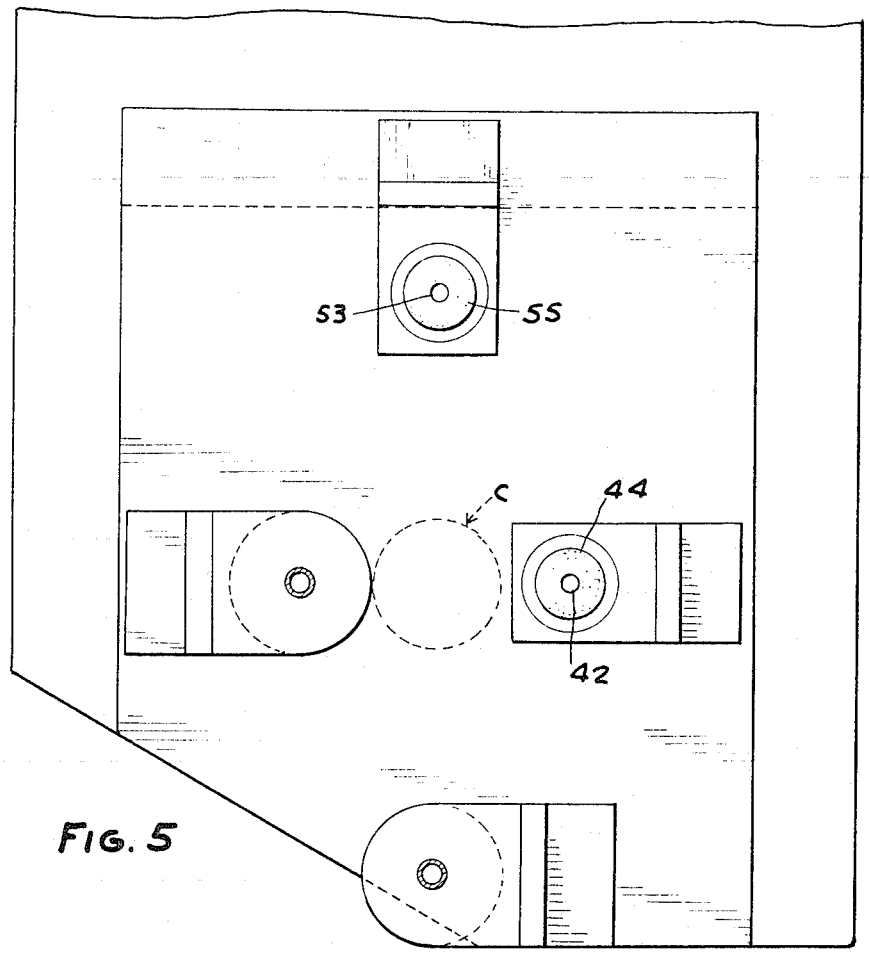
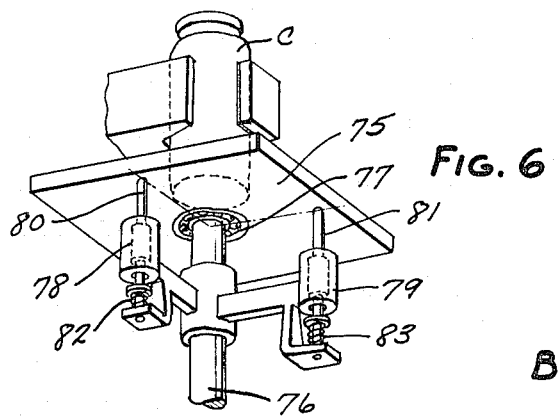

United States Patent Office 3,289,834
Patented Dec. 6, 1966

3,289,834
INSPECTING CONTAINERS FOR SLANT
BOTTOM CONDITION
Benny B. Mathias, Maumee, Ohio, assignor to Owens-Illinois, Inc., a corporationn of Ohio
Filed Sept. 23, 1963, Ser. No. 310,601
8 Claims. (Cl. 209—80)

This invention relates to inspecting hollow containers made of glass or similar materials for a slant bottom condition.

In the making of hollow containers such as glass vials, a deviation sometimes exists between the axis of the vial and the plane of the bottom wall of the vial. If the axis of the vial deviates more than a predetermined amount from the plane of the bottom wall, the container should be discarded.

It is an object of this invention to provide a method and apparatus for inspecting hollow containers such as vials to determine whether the axis of the vial deviates from the plane of tthe bottom wall more than a predetermined amount.

It is a further object of the invention to provide such a method and apparatus for inspecting the containers quickly and accurately.

It is a further object of the invention to provide such an apparatus which is relatively simple.

Basically, the invention comprises positioning the container with its axis in predetermined position, causing a contact member to engage the end wall and thereby assume an angular position corresponding to the plane of the end wall with respect to the axis of the container and creating a signal in response to deviation of the contact member from a predetermined angular relation to the axis of the container. In the apparatus embodying the invention, the signal is achieved by movement of the cores of differential transformers which are positioned at angularly spaced points with relation to the axis of the container and are adapted to be moved by the relative movement of the contact member.

In the drawings:

FIG. 4 is a wiring diagram of the apparatus.

FIG. 5 is a fragmentary plan view, parts being broken away, of the apparatus shown in FIGS. 1 and 2.

FIG. 6 is a fragmentary perspective view of a modified form of apparatus.

Figure 3:
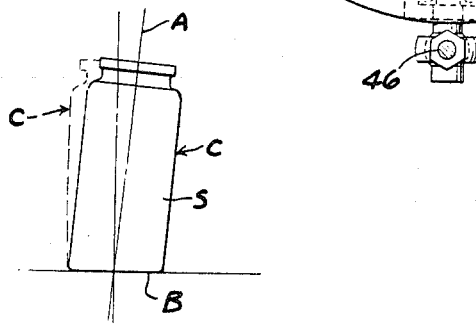
FIG. 3 is an elevational view showing a container having the defect which is to be detected in accordance with the invention.

Referring to FIG. 3, the container C which is to be inspected is hollow and comprises a side wall S herein shown as cylindrical and a bottom wall B which is generally flat. The bottom wall B has a predetermined angular relation to the axis A of the container. In a satisfactory container, the bottom wall B is at 90 degrees to the axis A of the container. The method and apparatus embodying the invention is intended to detect when the angular relation between the plane of the bottom wall B and the axis A deviates more than a predetermined amount from a 90 degree relationship.

Figure 1:
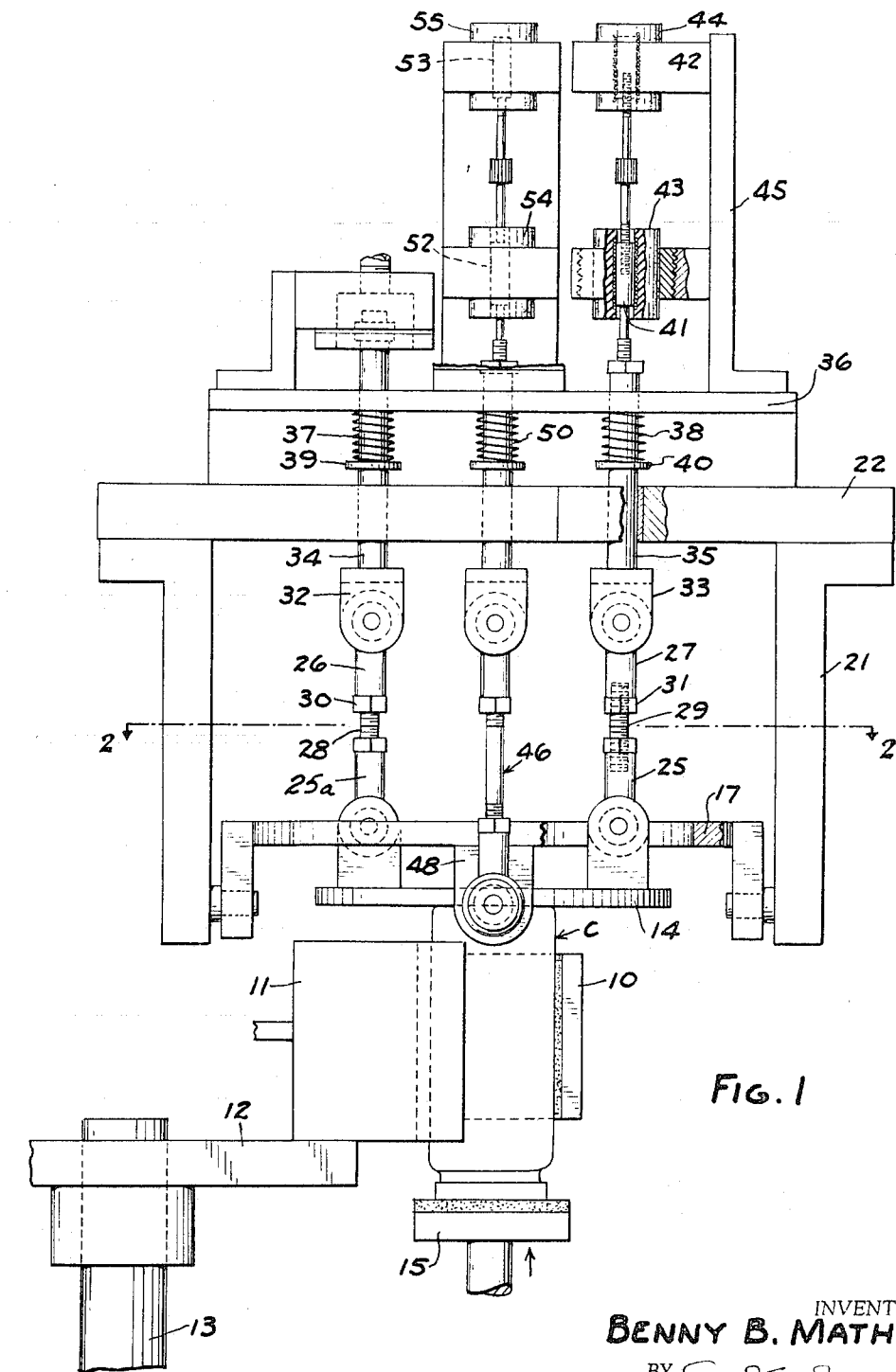
FIG. 1 is a part sectional fragmentary elevational view of an apparatus embodying the invention.
Figure 2:
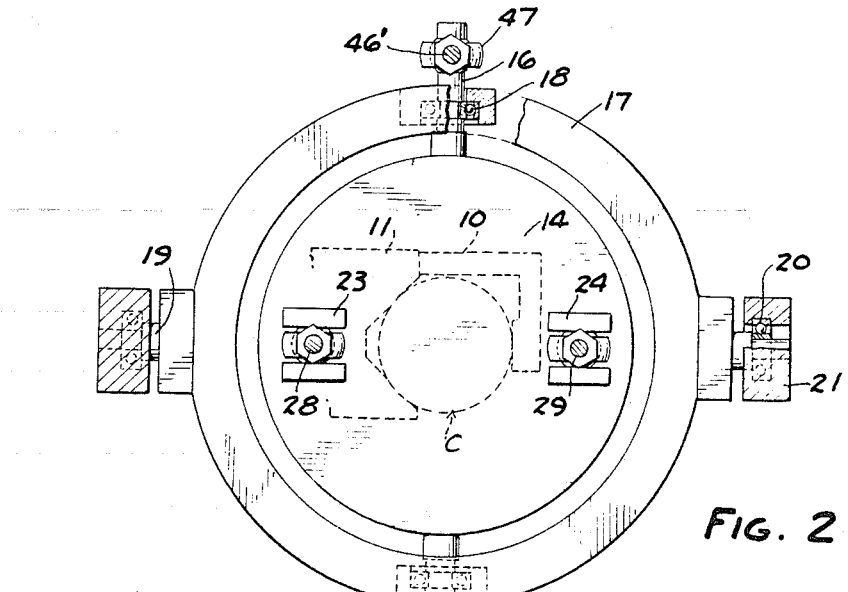
FIG. 2 is a sectional view taken along the line 2—2 in FIG. 1, parts being broken away.

Referring to FIGS. 1 and 2, the container C is adapted to be gripped by a clamping member 10 against a V block 11 which, in turn, is mounted on an arm 12 that is fixed to a shaft 13. Rotation of the shaft 13 swings the arm 12 and brings the container C into position beneath a contact plate 14. The contact plate 14 is mounted as presently described for angular movement about axes at right angles to the axis of the container C so that it will assume an angular relation to the axis of the container C which corresponds to the plane of the bottom wall B. The container C after being brought into position beneath the contact member 14 is pushed upwardly by an elevating pad 15 which engages the opposite end of the container and moves the container to bring the bottom wall B into contact with the contact member 14. The clamping member 10 and V block 11 maintain the container C with its axis in predetermined angular relation, herein shown as vertical. Since the contact member assumes an angular relation corresponding to the plane of the bottom wall, the contact member 14 will indicate any deviation.

Referring to FIG. 2, contact member 14 has short shafts 16 extending diametrally outwardly from opposite sides thereof and journalled in a ring 17 by ball bearings 18. Ring 17, in turn, has diametrally extending short shafts 19 journalled by ball bearings 20 in downwardly extending arms 21 of a frame 22.

The contact member 14 is thereby able to swing angularly about an axis extending through the axes of the shafts 16 and about an axis extending through the axes of the shafts 19. The axes containing the shafts 16 and 19 lie in the same plane and intersect one another at 90 degrees.

It can thus be seen that if the plane B of the bottom wall of the container C deviates from a right angle relationship with the axis A of the container, the contact member 14 will move and assume a position that corresponds to the plane B of the bottom wall. This movement will be evidenced by angular movement of the contact plate about the axis of the shafts 16 and/or the axis of the shafts 19.

As shown in FIGS. 1 and 2, upstanding bracket members 23 are provided at diametral points on the upper surface of the contact member 14 at right angles to the axis extending through the shafts 16. Connecting shafts 25a, 25 are pivotally connected to the brackets 23, 24 about axes parallel to the axis through the shafts 16. Secondary connecting rods 26, 27 are connected to the first-mentioned connecting rods 25a, 25 by threaded shafts 28, 29 locked in adjusted position by nuts 30, 31 so that the length of the overall shaft formed by the connecting rod and threaded shafts can be varied.

The upper ends of the rods 26, 27 are pivotally connected to yokes 32, 33 about axes parallel to the axes of the pivotal connection of the rods 25a, 25 with the brackets 23, 24, respectively. Shafts 34, 35 are fixed to the upper ends of the yokes 32, 33 and extend through guide bearings in the frame 22 upwardly and through a secondary plate 36. Springs 37, 38 extend between the underside of the plate 36 and collars 39, 40 to yieldingly urge the shafts 34, 35 downwardly and, in turn, apply an equal yielding force to opposed sides of the contact member 14 and, in turn, removes the accumulated clearance at the pivotal points. Cores 41, 42 of differential transformers 43, 44 are mounted on the upper end of the shaft 35 in spaced relation to one another for movement in the fields of the windings of differential transformers 43, 44 there fixed on a bracket 45 mounted on the upper end of plate 36. The differential transformers 43, 44 are connected to indicate deviation of the plate or contact member 14 angularly about the axis of the shaft 16.

In a similar manner, extensible connecting rods generally designated 46, 47 are pivoted to downwardly extending brackets 48, 49 on the ring 17 and extend upwardly through bearings in the frame 22 and openings in the plate 36. Springs 50 yieldingly urge the opposed sides of the ring equally downwardly. The cores 52, 53 of differential transformers 54, 55 are mounted on the upper end of one of the connecting rods 46 designated as 46′ in FIG. 2 so that the differential transformers will create a signal in response to angular movement of the ring 17 about the axis containing the axes of the shafts 19.

Referring to the schematic wiring diagram FIG. 4, the differential transformers 43, 44 comprise a first channel and differential transformers 52, 53 comprise a second channel. The input to the linear variable differential-transformer 43 is through the block connection indicated DRIVER. The output from the transformer 43 goes to the amplifier 60, with the output of the amplifier supplying the input through the block "A" to the linear variable differential transformer 44. Both of these transformers are mechanically coupled together so that the position of the cores of either of the transformers will always be essentially the same. By having the output of one transformer used as the input of the other transformer, the signal output from the second transformer 44 at block "E" will go to the second amplifier 61 with its output then going through connection point "C" to the summing driver circuit. This output will be proportional to the square of the displacement of the cores of the transformers. In a like manner, the outputs of transformers 53, 54 will provide a signal which is fed to the summing drivers from the point designed "C" and its connection. This signal will also be proportional to the square of the displacement of the cores for their respective transformers.

The output of the first channel is fed through a phase shifter 62 to a dual emitter follower 63. The output of the second channel is fed to the dual emitter follower 63. The sum of the two voltages appears across the 100K resistor which is fed into the pin of linear amplifier 64.

The output of linear amplifier 64 is fed into a diode base clipper 65 which passes only that voltage in excess of a predetermined level. This excess voltage is then fed to the linear amplifier 66. Since the predetermined base clipper voltage is set close to the reject level, the linear amplifier 66 amplifies only those voltages in the neighborhood of the reject level. This system permits better electronic resolution in the vicinity of reject.

The output of linear amplifier 66 is fed to a Schmitt trigger 67. When the applied voltage exceeds the trigger level, Schmitt trigger 67 applies a pulse to AND gate 68. No output results until a gauging pulse is applied to gate 68.

As the container moves into the gauging position, the gauging switch grounds one shot 69 causing a negative pulse. Since pulse amplifier 70 amplifies only positive going signals nothing happens until the one shot 69 returns to its steady state condition. This provides time for the container to get into the gauging position. After a predetermined time interval the one shot 69 returns to its original state and applies a positive going signal to pulse amplifier 70. The positive going pulse is amplified and applied to one shot 69.

The output of the one shot 69 is applied to an AND gate 68 for a predetermined period of time. If a signal from the Schmitt trigger appears at the AND gate 68 during this time period a reject signal pulse is sent to one shot 72 from the AND gate 68.

The output of the AND gate 68 is fed to one shot 72 which, in turn, sends a signal to the emitter follower 73. The reject pulse from emitter follower 73 energizes the gate of the silicon controlled rectifier 74. The silicon controlled rectifier energizes the reject relay.

The various electronic components may be of the types shown and described in the catalog 859, Revision C, dated December 1, 1961, of Engineered Electronics Company, Santa Ana, California, i.e., dual emitter follower T115, linear amplifier T108, Schmitt trigger T106, AND gate T408, one shot T105, pulse amplifier T118 and emitter follower T114.

By the above-described apparatus, the angle between projections of the container axis and the bottom plane in each of the perpendicular planes whose intersection coincides with the axis of the container is measured.

Since the angle is relatively small, the two measured angles are related to the deviation or tilt angle of the axis of the container with respect to the bottom wall by the relationship of the tilt angle equals the vector sum of the two projected angles.

The mathematical explanation for squaring the angle of rotation about the "$x$" and "$y$" axis before adding the analog voltages is as follows:

$$\frac{x}{a}+\frac{y}{b}+\frac{z}{c}=K \qquad \text{equation of a plane}$$

The normal to the plane is a vector $$\vec{m}=\vec{i}\,\frac{\frac{1}{a}}{\sqrt{\left(\frac{1}{a}\right)^2+\left(\frac{1}{b}\right)^2+\left(\frac{1}{c}\right)^2}}+\vec{j}\,\frac{\frac{1}{b}}{\sqrt{\left(\frac{1}{a}\right)^2+\left(\frac{1}{b}\right)^2+\left(\frac{1}{c}\right)^2}}+\vec{k}\,\frac{\frac{1}{c}}{\sqrt{\left(\frac{1}{a}\right)^2+\left(\frac{1}{b}\right)^2+\left(\frac{1}{c}\right)^2}}$$

$$\frac{\frac{1}{c}}{\sqrt{\left(\frac{1}{a}\right)^2+\left(\frac{1}{b}\right)^2+\left(\frac{1}{c}\right)^2}}=\text{cosine of the angle between }\vec{m}\text{ and the }z\text{ axis}$$

The square of the sine of the angle between the normal and the "$z$" axis is:

$$sin^2 d = 1-\cos^2 d = 1-\frac{\left(\frac{1}{c}\right)^2}{\left(\frac{1}{a}\right)^2+\left(\frac{1}{b}\right)^2+\left(\frac{1}{c}\right)^2}=\frac{\left(\frac{1}{a}\right)^2+\left(\frac{1}{b}\right)^2}{\left(\frac{1}{a}\right)^2+\left(\frac{1}{b}\right)^2+\left(\frac{1}{c}\right)^2}$$

The square of the projection of the normal "$\vec{m}$" on the "$x$" axis is:

$$\frac{\left(\frac{1}{a}\right)^2}{\left(\frac{1}{a}\right)^2+\left(\frac{1}{b}\right)^2+\left(\frac{1}{c}\right)^2}$$

The square of the projection of the normal on the "$y$" axis is:

$$\frac{\left(\frac{1}{b}\right)^2}{\left(\frac{1}{a}\right)^2+\left(\frac{1}{b}\right)^2+\left(\frac{1}{c}\right)^2}$$

It is seen that the sum of the squares of the projections of the normal on the "$x$" and "$y$" axis is equal to the square of the line of the angle between the normal and the "$z$" axis. For small angles $\sin\theta - \theta$.

I claim:
1. The method of inspecting containers such as ampules and the like which have a generally tubular body and a transverse end wall to determine the alignment of the end wall with the axis of the tubular body which comprises the steps of
    positioning the container with its axis in a predetermined position,
    simultaneously sensing the relative positions of a plurality of points on the end wall sufficient to define the plane of the end wall, creating a signal corresponding to the angle of the plane thus defined, comparing the angle of the plane thus defined by said signal with a predetermined angular relation to the axis of the container, and creating a reject signal in response to any deviation of the plane thus defined from said predetermined angular relation.

2. An apparatus for inspecting containers such as ampules and the like which have a generally flat end wall and a tubular body to determine the alignment of the end wall with respect to the axis of the tubular body which comprises means for supporting said ampule with its axis in predetermined position, a flat contact plate, means for mounting said plate for universal angular movement about the axis of the ampule, means for holding said contact plate member in engagement with the end wall of said ampule, means for sensing the angular position of said contact plate when it is in engagement with said end wall with respect to the axis of the tubular body of said ampule, and means for creating a signal when the angular position of said contact plate with respect to the axis of said ampule deviates from a predetermined standard.

3. The combination set forth in claim 2 wherein said means for sensing the angular movement of said plate comprises at least two differential transformers, each transformer having an armature and a coil, said transformers being positioned at circumferentially and angularly spaced points with their cores operatively connected to said plate.

4. An apparatus for inspecting containers such as ampules and the like which have a generally flat end wall and a tubular body to determine the alignment of the end wall with respect to the axis of the tubular body which comprises means for supporting said ampule with its axis in predetermined position, a contact plate, means for mounting said plate for angular movement and for universal movement about the axis of the ampule, means for holding said contact member in engagement with the end wall of said ampule, means for sensing the angular position of said contact member when it is in engagement with said end wall with respect to the axis of the tubular body of said ampule, and means for creating a signal when the angular position of said contact member with respect to the axis of said ampule deviates from a predetermined standard.

5. The combination set forth in claim 4 wherein said means for mounting said plate comprises a ring in which said plate is mounted for rotation about a first diametral axis, and means for mounting said ring for rotation about a second diametral axis 90° to said first diametral axis.

6. The combination set forth in claim 4 wherein said means for sensing the angular movement of said plate comprises at least two differential transformers, each transformer having an armature and a coil, said transformers being positioned at circumferentially and angularly spaced points with their cores operatively connected to said plate.

7. An apparatus for inspecting containers such as ampules and the like which have a generally flat end wall and a tubular body to determine the alignment of the end wall with respect to the axis of the tubular body which comprises means for supporting said ampule with its axis in predetermined position, a contact plate, means for mounting said plate for angular movement and for universal movement about the axis of the ampule, means for holding said contact member in engagement with the end wall of said ampule, means for sensing the angular position of said contact member when it is in engagement with said end wall with respect to the axis of the tubular body of said ampule, means for creating a signal when the angular position of said contact member with respect to the axis of said ampule deviates from a predetermined standard, and means for rejecting said container in response to said signal.

8. An apparatus for inspecting containers such as ampules and the like which have a generally flat end wall and a tubular body to determine the alignment of the end wall with respect to the axis of the tubular body which comprises means for supporting said ample with its axis in predetermined position, a flat contact plate, means for mounting said plate for universal angular movement about the axis of the ampule, means for holding said contact plate member in engagement with the end wall of said ampule, means for sensing the angular position of said contact plate when it is in engagement with said end wall with respect to the axis of the tubular body of said ampule, means for creating a signal when the angular position of said contact plate with respect to the axis of said ampule deviates from a predetermined standard, and means for rejecting said container in response to said signal.

References Cited by the Examiner

UNITED STATES PATENTS

| 2,338,868 | 1/1944 | Owens | 209—82 |
| 2,789,693 | 4/1957 | Harder | 209—88 |
| 3,073,034 | 1/1963 | Antoszewski | 209—88 X |
| 3,106,780 | 10/1963 | Uhlig | 209—88 X |
| 3,107,011 | 10/1963 | Mathias | 209—111.7 |
| 3,196,550 | 7/1965 | McMeekin | 209—90 X |

M. HENSON WOOD, JR., *Primary Examiner.*

R. A. SCHACHER, *Assistant Examiner.*